US010113568B2

(12) United States Patent
Bannon

(10) Patent No.: US 10,113,568 B2
(45) Date of Patent: Oct. 30, 2018

(54) RAM AIR TURBINE HYDRAULIC RELEASE MECHANISM

(71) Applicant: Hamilton Sundstrand Corporation, Charlotte, NC (US)

(72) Inventor: David G. Bannon, Rockford, IL (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 85 days.

(21) Appl. No.: 15/048,196

(22) Filed: Feb. 19, 2016

(65) Prior Publication Data
US 2017/0241453 A1    Aug. 24, 2017

(51) Int. Cl.
F15B 15/26 (2006.01)
B64D 41/00 (2006.01)
F15B 1/027 (2006.01)
F15B 15/14 (2006.01)

(52) U.S. Cl.
CPC .......... F15B 15/261 (2013.01); B64D 41/007 (2013.01); F15B 1/027 (2013.01); F15B 15/14 (2013.01)

(58) Field of Classification Search
CPC ........ F15B 1/027; F15B 15/14; F15B 15/261; B64D 41/007
USPC .......................................................... 244/58
See application file for complete search history.

(56) References Cited

U.S. PATENT DOCUMENTS

| 3,799,051 | A | * | 3/1974 | Liberman | ............... B65F 3/201 100/179 |
| 4,355,280 | A | | 10/1982 | Duzich | |
| 4,717,095 | A | * | 1/1988 | Cohen | .................. B64D 41/007 244/58 |
| 4,742,976 | A | * | 5/1988 | Cohen | .................. B64D 41/007 244/58 |
| 5,123,614 | A | * | 6/1992 | Whitehouse | ......... B64D 41/007 244/102 SL |
| 5,174,719 | A | * | 12/1992 | Walsh | .................... F16N 27/005 184/6.11 |
| 5,484,120 | A | * | 1/1996 | Blakeley | .............. B64D 41/007 244/54 |
| 5,820,074 | A | * | 10/1998 | Trommer | ............. B64D 41/007 244/58 |
| 6,331,099 | B1 | * | 12/2001 | Eccles | .................. B64D 41/007 416/142 |
| 6,685,138 | B1 | | 2/2004 | Krantz | |

(Continued)

FOREIGN PATENT DOCUMENTS

GB      2161202 A    1/1986

Primary Examiner — Richard R Green
Assistant Examiner — Brady W Frazier
(74) Attorney, Agent, or Firm — Cantor Colburn LLP

(57) ABSTRACT

A ram air turbine actuator release device to release a ram air turbine actuator includes a lock bolt releasably engaged to the ram air turbine actuator, a toggle comprising a toggle roller to engage the lock bolt, and a toggle pivot to couple the toggle to the ram air turbine actuator, a hydraulic toggle actuator, including a piston defining a first hydraulic chamber and a second hydraulic chamber, a solenoid valve in fluid communication with the first hydraulic chamber, and a plunger coupled to the piston, wherein a pressure differential between the first hydraulic chamber and the second hydraulic chamber displaces the plunger to rotate the toggle to disengage the toggle roller from the lock bolt.

18 Claims, 4 Drawing Sheets

(56) References Cited

U.S. PATENT DOCUMENTS

2012/0297924 A1* 11/2012 Lang .................... B64D 41/007
                                                          74/99 R
2013/0327207 A1    12/2013 Sasscer et al.
2013/0330121 A1* 12/2013 Sasscer ................ B64D 41/007
                                                          403/322.4
2014/0070049 A1*  3/2014 Russ ......................... F03D 9/00
                                                          244/58

* cited by examiner

RAM AIR TURBINE HYDRAULIC RELEASE MECHANISM

BACKGROUND

The subject matter disclosed herein relates to release mechanisms, and more particularly, to release mechanisms for ram air turbines.

Ram Air Turbines (RATs) are utilized on numerous aircraft to provide hydraulic and electrical power in emergency situations. The RAT is stowed in the aircraft structure and deployed into the air stream by a deployment actuator. A release mechanism is utilized to release the deployment actuator as required. Often, the release mechanism may add additional weight to an aircraft and require adjustment to provide sufficient displacement and force for reliable operation.

BRIEF SUMMARY

According to an embodiment, a ram air turbine actuator release device to release a ram air turbine actuator includes a lock bolt releasably engaged to the ram air turbine actuator, a toggle comprising a toggle roller to engage the lock bolt, and a toggle pivot to couple the toggle to the ram air turbine actuator, a hydraulic toggle actuator, including a piston defining a first hydraulic chamber and a second hydraulic chamber, a solenoid valve in fluid communication with the first hydraulic chamber, and a plunger coupled to the piston, wherein a pressure differential between the first hydraulic chamber and the second hydraulic chamber displaces the plunger to rotate the toggle to disengage the toggle roller from the lock bolt.

According to an embodiment, a ram air turbine system includes a ram air turbine, a deployment actuator to deploy the ram air turbine, and a ram air turbine actuator release device to release the deployment actuator, the ram air turbine actuator release device including a lock bolt releasably engaged to the deployment actuator, a toggle comprising a toggle roller to engage the lock bolt, and a toggle pivot to couple the toggle to the deployment actuator, a hydraulic toggle actuator, including a piston defining a first hydraulic chamber and a second hydraulic chamber, a solenoid valve in fluid communication with the first hydraulic chamber, and a plunger coupled to the piston, wherein a pressure differential between the first hydraulic chamber and the second hydraulic chamber displaces the plunger to rotate the toggle to disengage the toggle roller from the lock bolt.

Technical function of the embodiments described above includes a hydraulic toggle actuator, including a piston defining a first hydraulic chamber and a second hydraulic chamber, a solenoid valve in fluid communication with the first hydraulic chamber, and a plunger coupled to the piston, wherein a pressure differential between the first hydraulic chamber and the second hydraulic chamber displaces the plunger to rotate the toggle to disengage the toggle roller from the lock bolt.

Other aspects, features, and techniques of the embodiments will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the FIGURES:

DETAILED DESCRIPTION

Figure 1:
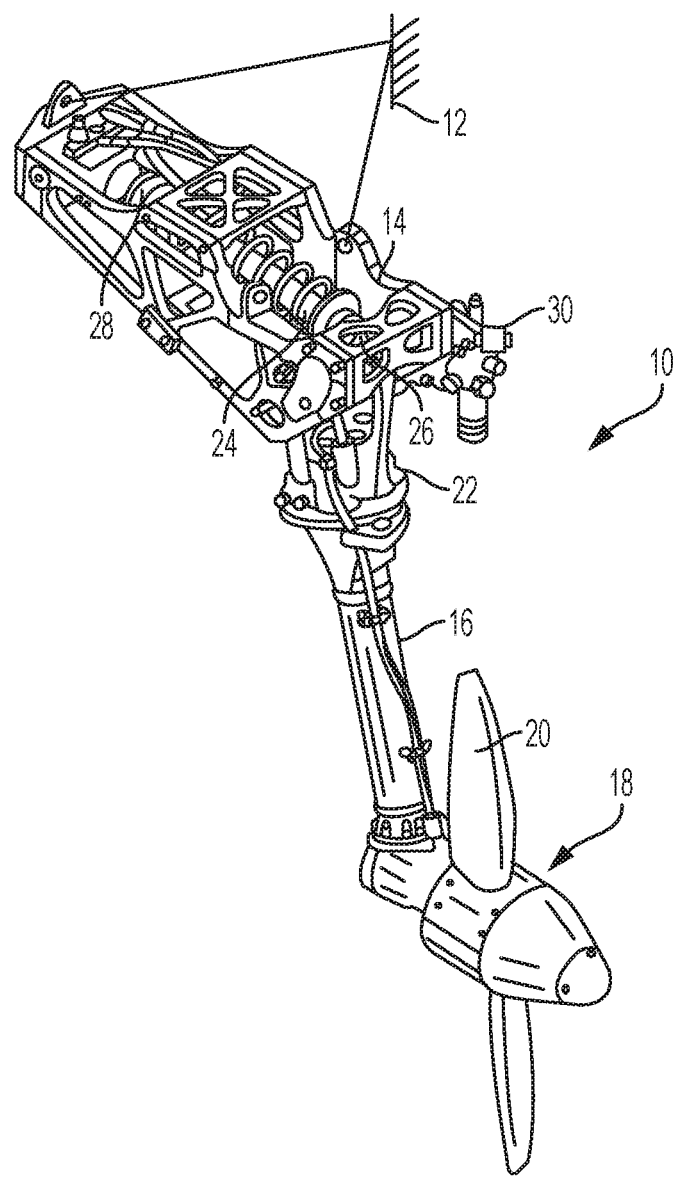
FIG. 1 is an isometric view of one embodiment of a ram air turbine.

Referring to the drawings, FIG. 1 shows a ram air turbine (RAT) system 10. In the illustrated embodiment, the RAT system 10 includes a housing 14, a strut 16, a turbine 18 and a deployment actuator 24. In the illustrated embodiment, the turbine 18 can be deployed into the airstream to generate electricity or pressurize hydraulic fluid for use within the aircraft during emergency events.

In the illustrated embodiment, the RAT system 10 is secured to an aircraft structure 12 by the housing 14. The housing 14 pivotally supports a strut 16 having a turbine 18 at one end. The turbine 18 includes blades 20, which impart rotational drive to at least one of a generator 22 and/or a hydraulic pump 30.

In the illustrated embodiment, the deployment actuator 24 is secured to the strut 16 at a first end 26 and to the housing 14 at a second end 28. In the illustrated embodiment, the deployment actuator 24 is stowed in a compressed position to allow the deployment actuator 24 to release the strut 16 and the turbine 18 when the deployment actuator 24 is released. In FIG. 1 the actuator 24 is illustrated in its deployed position.

Figure 2:
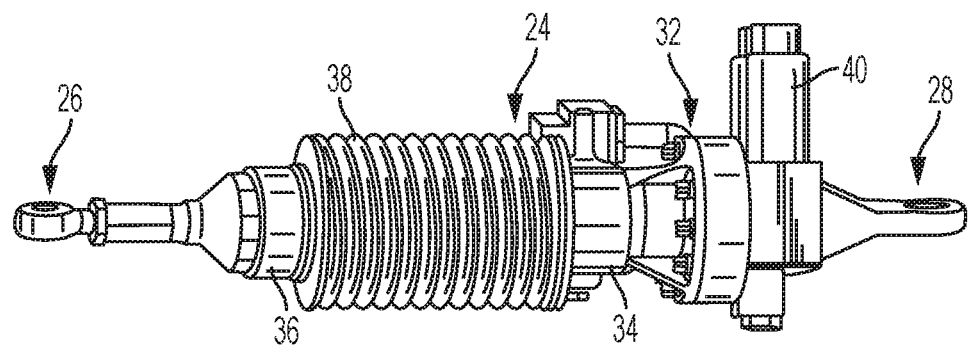
FIG. 2 is an isometric view of one embodiment of a deployment actuator for use with the ram air turbine of FIG. 1.
Figure 3:
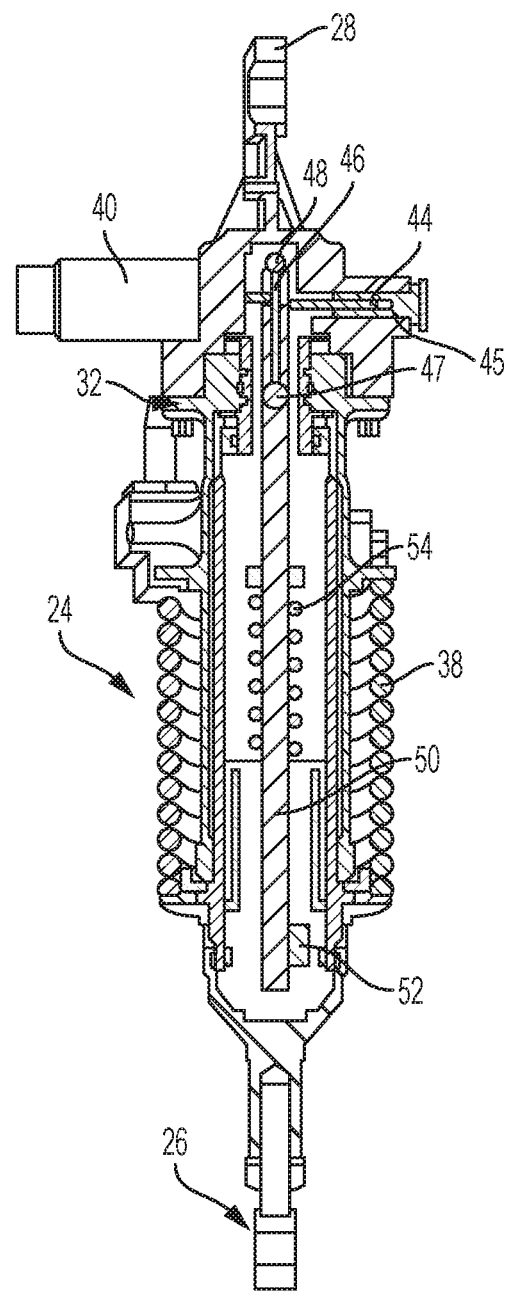
FIG. 3 is a cross sectional view of the deployment actuator of FIG. 2.

Referring to FIGS. 2 and 3, the deployment actuator 24 is shown. In the illustrated embodiment, the deployment actuator 24 has a first end 26, a second end 28, a housing 32, a first cylinder 34, a second cylinder 36, a deployment spring 38 and a release mechanism 40. In the illustrated embodiment, the first cylinder 34 and the second cylinder 36 are telescopically arranged relative to each other.

In the illustrated embodiment, the deployment spring 38 is arranged between the first cylinder 34 and the second cylinder 36. In FIG. 2, the deployment spring 38 is shown in a compressed state with the actuator 24 in its retracted position. Advantageously, the energy required to deploy the turbine 18 is stored in the deployment spring 38 when the actuator 24 is in the retracted position.

In the illustrated embodiment, the release mechanism 40 is mounted near the second end 28 of the actuator 24. In the illustrated embodiment, the release mechanism 40 can be actuated to initiate the deployment sequence within the deployment actuator 24 and release the deployment spring 38.

Referring to FIG. 3 a simplified cross sectional view of the deployment actuator 24 is shown. In the illustrated embodiment, the deployment actuator 24 further includes a toggle 46, a reset plunger 44, and a lockbolt 50.

In the illustrated embodiment, the lockbolt 50 is shown in a simplified manner. In the illustrated embodiment, the lockbolt 50 within the deployment actuator 24 can actuate or otherwise manipulate the actuator locking mechanism 52. In the illustrated embodiment, the lockbolt 50 is biased in an upward position by the lockbolt spring 54 acting upon a shoulder or collar on the lockbolt 50.

In the illustrated embodiment, the actuator locking mechanism 52 is a pawl or ratchet mechanism that selectively keeps the deployment spring 38 compressed. In certain embodiments, the actuator locking mechanism 52 is any suitable mechanism to keep the deployment spring 38 compressed. In the illustrated embodiment, the actuator locking mechanism 52 can be disengaged by the upward movement of the lockbolt 50. After the actuator locking mechanism 52 is disengaged, the actuator locking mechanism 52 can release the deployment spring 38 to allow the deployment actuator 24 to deploy the turbine 18.

In the illustrated embodiment, the toggle 46 can prevent the upward movement of the lockbolt 50 until deployment is required. In the illustrated embodiment, the toggle 46 includes a toggle pivot 47 and a toggle roller 48. In the illustrated embodiment, the toggle 46 is a rigid bar that is fixed to the second end 28 via a toggle pivot 47. The toggle 46 can rotate about the toggle pivot 47. In the illustrated embodiment, the toggle roller 48 is disposed on the opposite end of the toggle 46 and follows the upper profile of the lockbolt 50. In a retracted position, the toggle roller 48 follows a flat surface of the lockbolt 50. In this position the toggle 46 reacts against the upward force of the lockbolt spring 54 to retain the lockbolt 50 in a retracted position.

In the illustrated embodiment, the plunger 42 can displace the toggle 46 in order to deploy the deployment actuator 24. In certain embodiments, the plunger 42 can displace the toggle 46 approximately ⅛$^{th}$ of an inch to release the lockbolt 50. Further, in certain embodiments, the plunger 42 can apply a constant force to the toggle 46 to overcome the force of the lockbolt spring 54. In the illustrated embodiment, the plunger 42 is translated by the release mechanism 40. Advantageously, the release mechanism 40 can provide sufficient displacement and force for reliable operation of the lockbolt 50 without requiring additional adjustments such as shimming.

During operation, the plunger 42 pushes the toggle 46 to cause the toggle roller 48 to roll along the top of the lockbolt 50. As the toggle roller 46 rolls along the top of the lockbolt 50, the toggle 46 may require a constant force to overcome the bias force provided by the lockbolt spring 54. In the illustrated embodiment, as the toggle roller 48 reaches the rounded corner of the lockbolt 50, the toggle 46 no longer has to overcome the bias force of the lockbolt spring 54 to rotate about the toggle pivot 47. In the illustrated embodiment, the lockbolt 50 is free to move axially after the toggle 46 is pushed beyond the lockbolt 50. After the lockbolt 50 is disengaged by the toggle 46, the lockbolt 50 may be urged upward by the lockbolt spring 54. The lockbolt 50 can then release the actuator locking mechanism 52 as described.

After the deployment actuator 24 has been released, the deployment actuator 24 can be retracted to prepare the deployment actuator 24 for another use. As the deployment actuator 24 is retracted, the deployment spring 38 can be compressed to re-energize the deployment actuator 24. In the illustrated embodiment, the lockbolt 50 can be moved downward to recompress the lockbolt spring 54. As the lockbolt spring 54 is compressed and the lockbolt 50 is moved downward, the reset plunger 44 can urge the toggle 46 back to an engaged position. The reset plunger spring 45 can push the reset plunger 44 to place the toggle 46 on the top portion of the lockbolt 50.

Figure 4:
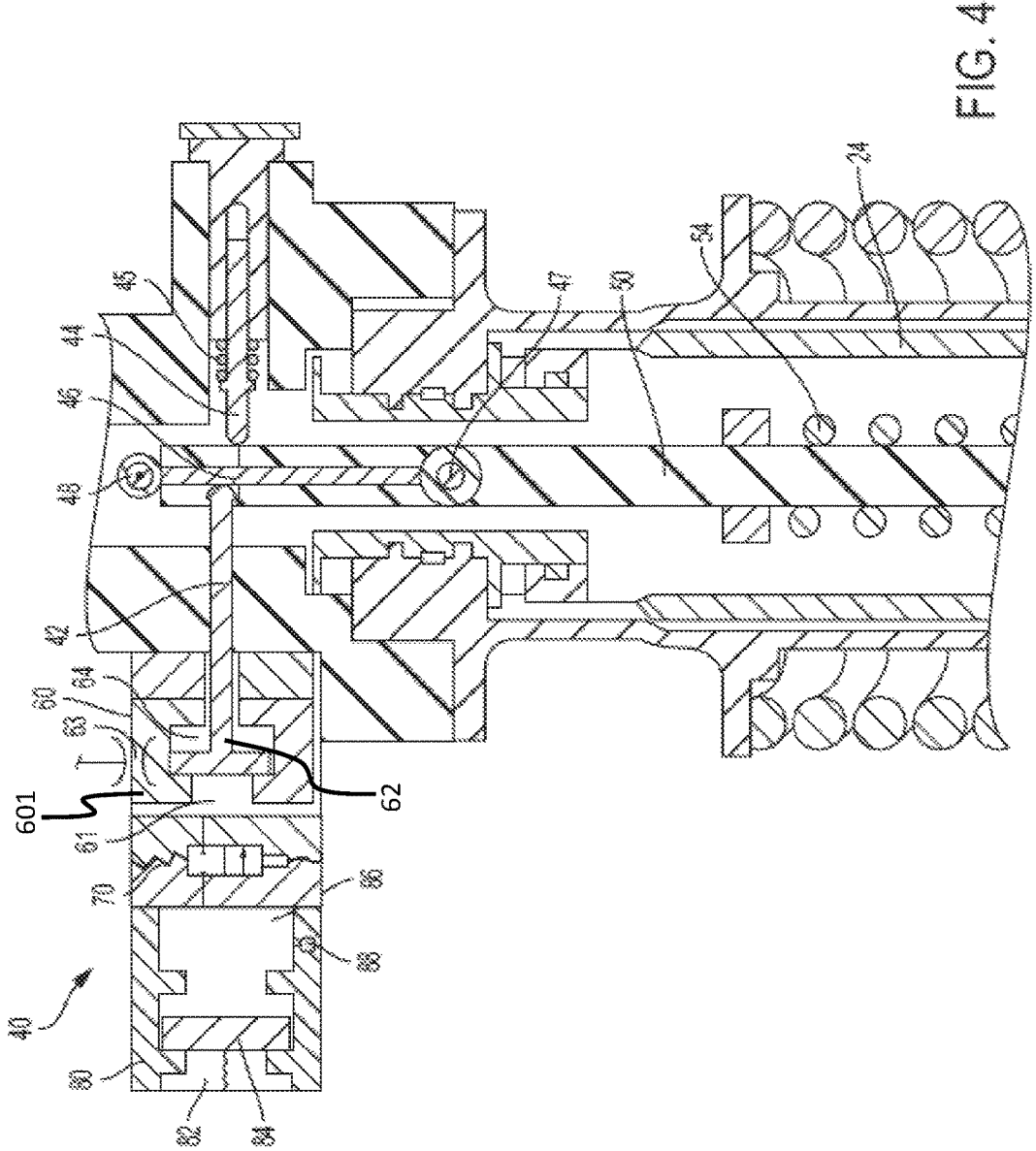
FIG. 4 is a schematic view of one embodiment of a release mechanism for use with the deployment actuator of FIG. 2.

Referring to FIG. 4, the release mechanism 40 is shown in greater detail. In the illustrated embodiment, the release mechanism 40 includes a hydraulic actuator 60 and a solenoid valve 70. In certain embodiments, the release mechanism 40 includes an accumulator 80.

In the illustrated embodiment, the hydraulic actuator 60 includes a housing 601, a piston 62, a first chamber 61, a second chamber 64, and a return orifice 63. In the illustrated embodiment, the piston 62 is disposed within the hydraulic actuator 60 and defines the first chamber 61 and the second chamber 64 within the housing 601 and the solenoid valve 70 is disposed immediately adjacent to the housing 601 and the first chamber 61. As the piston 62 moves within the housing 601 of the hydraulic actuator 60, the piston 62 can adjust the size of the first chamber 61 and the second chamber 64 by translating within the housing 601 of the hydraulic actuator 60.

In the illustrated embodiment, the solenoid valve 70 can selectively provide hydraulic fluid from a high pressure hydraulic source. In certain embodiments, the high pressure hydraulic source can be from aircraft hydraulic systems or any other suitable source. During operation, voltage can be applied to the solenoid valve 70 to open the valve to allow high pressure hydraulic fluid to flow into the first chamber 61. Advantageously, the solenoid valve 70 can be powered by DC power which may be readily available within the aircraft.

In certain embodiments, the high pressure hydraulic source for the solenoid valve 70 is the accumulator 80. In the illustrated embodiment, the accumulator 80 can receive and accumulate hydraulic fluid from the aircraft hydraulic system to provide hydraulic fluid to the solenoid valve 70. In the illustrated embodiment, the accumulator 80 can receive hydraulic fluid within the accumulator chamber 86 and maintain a desired pressure by providing a force via the accumulator spring 82 and the accumulator piston 84. In certain embodiments, the check valve 88 can allow for fluid to enter the accumulator 80 from a hydraulic source without losing pressure. Advantageously, the accumulator 80 allows for high pressure hydraulic fluid to be available even if aircraft hydraulic systems are not able to provide hydraulic fluid during emergency events or other events that require the deployment of the RAT system 10.

In the illustrated embodiment, after the solenoid valve 70 is energized, pressure increases in the first chamber 61, causing the pressure differential between the first chamber 61 and the second chamber 64 to increase. As a result, the piston 62 can translate in response to the pressure difference between the first chamber 61 and the second chamber 64. In the illustrated embodiment, the plunger 42 is coupled to the piston 62 to move with the piston 62.

Advantageously, the hydraulic actuator 60 can provide a constant force to the plunger 42 and consequently to the toggle 46. In certain embodiments, the displacement of the piston 62 and therefore the plunger 42 can be adjusted by adjusting the travel of the piston 62 within the hydraulic actuator 60. In the illustrated embodiment, the second chamber 64 can have a travel limiter to limit the travel of the piston 62. Therefore, the force and displacement of the hydraulic actuator 60 can be adjusted by adjusting the pressure of the hydraulic fluid supplied and the geometry of the piston 62 and the chambers 61, 64.

After the plunger 42 has been deployed, the pressure within the first chamber 61 can be relieved to remove fluid via the return orifice 63. Hydraulic fluid can flow out the return orifice 63 to allow the plunger 42 to be reset as needed.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. A ram air turbine actuator release device to release a ram air turbine actuator, the ram air turbine actuator release device comprising:
   a lock bolt releasably engaged to the ram air turbine actuator;
   a toggle comprising a toggle roller to engage the lock bolt, and a toggle pivot to couple the toggle to the ram air turbine actuator;
   a hydraulic toggle actuator, comprising:
      a housing;
      a piston defining a first surface of a first hydraulic chamber and a second hydraulic chamber within the housing;
      a solenoid valve disposed immediately adjacent to the housing and the first hydraulic chamber and in fluid communication with the first hydraulic chamber to define a second surface of the first hydraulic chamber, which is opposite the first surface of the first hydraulic chamber; and
      a plunger coupled to the piston, wherein a pressure differential between the first hydraulic chamber and the second hydraulic chamber causes the piston to translate within the housing to thereby displace the plunger such that the plunger rotates the toggle to disengage the toggle roller from the lock bolt.

2. The ram air turbine actuator release device of claim 1, wherein the piston is displaced a desired distance.

3. The ram air turbine actuator release device of claim 1, wherein the plunger applies a desired force.

4. The ram air turbine actuator release device of claim 1, wherein the hydraulic toggle actuator further comprises a return orifice in fluid communication with the first hydraulic chamber.

5. The ram air turbine actuator release device of claim 1, wherein the solenoid valve selectively provides hydraulic pressure to the first hydraulic chamber.

6. The ram air turbine actuator release device of claim 1, wherein the solenoid valve is in fluid communication with an aircraft hydraulic system.

7. The ram air turbine actuator release device of claim 1, further comprising a hydraulic accumulator in fluid communication with an aircraft hydraulic system.

8. The ram air turbine actuator release device of claim 7, wherein the hydraulic accumulator is in fluid communication with the solenoid valve.

9. The ram air turbine actuator release device of claim 1, further comprising a reset plunger to bias the toggle to an engaged position.

10. A ram air turbine system, comprising:
    a ram air turbine;
       a deployment actuator to deploy the ram air turbine; and
       a ram air turbine actuator release device to release the deployment actuator, the ram air turbine actuator release device comprising:
          a lock bolt releasably engaged to the deployment actuator;
          a toggle comprising a toggle roller to engage the lock bolt, and a toggle pivot to couple the toggle to the deployment actuator;
          a hydraulic toggle actuator, comprising:
             a housing
             a piston defining a first surface of a first hydraulic chamber and a second hydraulic chamber within the housing;
             a solenoid valve disposed immediately adjacent to the housing and the first hydraulic chamber and in fluid communication with the first hydraulic chamber to define a second surface of the first hydraulic chamber, which is opposite the first surface of the first hydraulic chamber; and
             a plunger coupled to the piston, wherein a pressure differential between the first hydraulic chamber and the second hydraulic chamber causes the piston to translate within the housing to thereby displace the plunger such that the plunger rotates the toggle to disengage the toggle roller from the lock bolt.

11. The ram air turbine system of claim 10, wherein the piston is displaced a desired distance.

12. The ram air turbine system of claim 10, wherein the plunger applies a desired force.

13. The ram air turbine system of claim 10, wherein the hydraulic toggle actuator further comprises a return orifice in fluid communication with the first hydraulic chamber.

14. The ram air turbine system of claim 10, wherein the solenoid valve selectively provides hydraulic pressure to the first hydraulic chamber.

15. The ram air turbine system of claim 10, wherein the solenoid valve is in fluid communication with an aircraft hydraulic system.

16. The ram air turbine system of claim 10, further comprising a hydraulic accumulator in fluid communication with an aircraft hydraulic system.

17. The ram air turbine system of claim 16, wherein the hydraulic accumulator is in fluid communication with the solenoid valve.

18. The ram air turbine system of claim 10, further comprising a reset plunger to bias the toggle to an engaged position.

* * * * *